United States Patent [19]

Gretz et al.

[11] 4,249,545
[45] Feb. 10, 1981

[54] METHOD AND APPARATUS FOR PERFORATING THE ENVELOPES OF FILTER CIGARETTES OR THE LIKE

[75] Inventors: Heinz Gretz, Hamburg; Willy Rudszinat, Dassendorf; Heinz-Christen Lorenzen, Hamburg, all of Fed. Rep. of Germany

[73] Assignee: Hauni-Werke Körber & Co. KG, Hamburg, Fed. Rep. of Germany

[21] Appl. No.: 955,691

[22] Filed: Oct. 30, 1978

[30] Foreign Application Priority Data

Nov. 9, 1977 [DE] Fed. Rep. of Germany ....... 2750038

[51] Int. Cl.$^3$ .............................................. A24B 7/14
[52] U.S. Cl. ........................... 131/21 R; 219/121 LK
[58] Field of Search ..................... 131/253, 170, 23 R, 131/21 R, 15 R, 21 B; 219/384, 121 LM, 121 EM, 121 L, 121 LK

[56] References Cited

U.S. PATENT DOCUMENTS

| 3,921,644 | 11/1975 | Von der Lohe et al. ......... 131/21 D |
| 4,090,826 | 5/1978 | Hinzmann ..................... 131/170 R X |
| 4,121,595 | 10/1978 | Heitmann ..................... 131/21 R |

Primary Examiner—Stephen C. Pellegrino
Attorney, Agent, or Firm—Peter K. Kontler

[57] ABSTRACT

The making of perforations in the tubular envelopes of finished filter cigarettes or analogous rod-shaped smokers' products for the purpose of admitting cool atmospheric air into the column of tobacco smoke is regulated automatically in dependency on one or more variable parameters including the resistance of the rod-like filler of a product to axial flow of a gaseous fluid therethrough, the permeability of the entire tubular envelope, the resistance which the entire filler or the tobacco filler of a filter cigarette offers to axial or transverse flow of a gaseous fluid or to penetration of corpuscular radiation across successive increments of the filler, the resistance which successive increments of a web of cigarette paper offer to the penetration of air or light therethrough, and/or the quantity of tobacco particles in the smokers' products. The perforations are formed by laser beams, and the regulating step includes changing the intensity of laser beams and/or the length of intervals of impingement of laser beams upon the envelopes.

54 Claims, 10 Drawing Figures

METHOD AND APPARATUS FOR PERFORATING THE ENVELOPES OF FILTER CIGARETTES OR THE LIKE

BACKGROUND OF THE INVENTION

The present invention relates to a method and apparatus for regulating the making of holes or perforations in the envelopes of rod-shaped articles which constitute or form part of rod-shaped smokers's products. More particularly, the invention relates to a method and apparatus for automatically varying or changing the combined cross-sectional area of holes or perforations which are formed in finished rod-shaped smokers' products for the purpose of permitting a requisite quantity of cool atmosphere air to mix with tobacco smoke which flows into a smoker's mouth.

It is already known to provide the tubular envelopes of rod-shaped smoker's products, especially plain or filter cigarettes, with perforations which permit cool atmospheric air to mix with the column of tobacco smoke which is drawn into the mouth of a smoker. When the products are filter cigarettes, especially so-called light filter cigarettes, the holes are formed in that portion of the envelope which surrounds or is closely adjacent to the filter mouthpiece. This insures that the holes remain intact during consumption of the major portion of or the entire tobacco-containing part of the product. It is desirable to insure that the envelope will admit a relatively high percentage of cool atmospheric air, and it is equally desirable to insure that the ratio of cool atmospheric air to the ratio of tobacco smoke in the column which reaches the mouth of the smoker will remain constant or will deviate negligibly from a preselected ratio. This ratio can be called the "degree of ventilation".

It is already known to mechanically perforate the envelopes of filter cigarettes or like rod-shaped smokers' products (hereinafter called cigarettes or filter cigarettes for short) by causing the cigarettes to roll along needles or pins which extend from the surface of a cylindrical or flat body. It was also proposed to burn holes into the envelopes of cigarettes by resorting to spark discharge or to highly concentrated light beams, especially laser beams. Mechanical application of holes by puncturing the envelopes or removal of material of the envelopes (i.e., burning of holes into the envelopes) is carried out in such a way that the combined cross-sectional area of all holes in each of a series of tubular envelopes equals to closely approximates a desired value. Such mode of ventilating the envelopes of cigarettes or like products is not entirely satisfactory because the rate at which cool atmospheric air can flow into the interior of a lighted cigarette depends on a number of variable parameters, i.e., the application of holes whose combined cross-sectional area matches or approximates a predetermined cross-sectional area cannot invariably insure the admission of a certain optimum quantity of cool atmospheric air into the column of tobacco smoke which flows within the envelope from the lighted end toward and into the smoker's mouth.

Methods and apparatus for making holes in the envelopes of rod-shaped products are disclosed, among others, in commonly owned U.S. Pat. No. 4,090,826 granted May 23, 1978 to Alfred Hinzmann and U.S. Pat. No. 4,121,595 granted Oct. 24, 1978 to Uwe Heitmann et al on application Ser. No. 766,927 filed Feb. 9, 1977 now U.S. Pat. No. 4,118,735 as in commonly owned copending applications Ser. Nos. 841,108 filed Oct. 11, 1977, now U.S. Pat. No. 4,193,409 by Gunter Wahle et al., 805,712 filed June 13, 1977 by Uwe Heitmann et al. now abandoned and 864,441 filed Dec. 1977 by Elke Lüders et al.

OBJECTS AND SUMMARY OF THE INVENTION

An object of the invention is to provide a novel and improved method which insures the admission of a desired quantity of cool atmospheric air into the tubular envelope of each and every product of a series of rod-shaped smokers' products irrespective of deviations of certain characteristics of the constituents of successive products from an anticipated characteristic.

Another object of the invention is to provide a novel and improved method of making holes in the tubular envelopes of finished cigarettes or analogous rod-shaped smokers' products in such a way that the envelope of each product which is permitted to reach a customer exhibits a permeability that insures the establishment of a desired ratio of cold atmospheric air to tobacco smoke in the column of a gaseous fluid which flows toward the smoker's mouth.

A further object of the invention is to provide a method of the above outlined character which can insure the establishment of an acceptable ratio of cool atmospheric air to tobacco smoke regardless of whether or not the characteristics of one or more constituents of the products deviate from desired or anticipated characteristics.

An additional object of the invention is to provide a method which can be carried out in the course of normal processing of filter cigarettes or analogous rod-shaped smokers' products so that the resort to our method does not entail a reduction of the output of machines which are used for mass production of such products.

Another object of the invention is to provide a method which can be practiced in the course of the manufacture of filter cigarettes or analogous rod-shaped products in accordance with presently known mass-production techniques.

A further object of the invention is to provide a novel and improved apparatus for the practice of the above outlined method.

An additional object of the invention is to provide an apparatus which can be readily incorporated in or combined with existing machines for the mass production of filter cigarettes or the like.

Another object of the invention is to provide the apparatus with novel and improved means which can regulate the action of perforating instrumentalities with a high degree of accuracy and in dependency on changes of one or more variables which influence the rate of flow of cool atmospheric air into the interior of the envelope of a lighted smokers' product.

A further object of the invention is to provide the apparatus with novel and improved means for generating signals which are utilized to regulate the operation of perforating means.

Another object of the invention is to provide the apparatus with novel and improved means for preventing unsatisfactory products from reaching the purchasers.

A further object of the invention is to provide an apparatus which automatically regulates the perforating action upon the tubular envelopes of finished filter cigarettes or analogous rod-shaped smokers' products.

One feature of the invention resides in the provision of a method of increasing the permeability of tubular envelopes (e.g., tubular wrappers consisting of portions of webs made of cigarette paper, reconstituted tobacco, imitation cork, tobacco leaves or a combination of such materials) of cigarettes and analogous rod-shaped smokers' products wherein the envelope constitutes one component of the product and surrounds at least one rod-like body which constitutes another component of the product (the body may consist of tobacco particles, tobacco particles and one or more plugs of filter material, the filler of a plain cigarette and one or more filter plugs as well as one or more confined columns of air between the plain cigarette and the adjacent plug or between two neighboring plugs, or simply the rod-like filler of a plain cigarette).

The method comprises the steps of making holes in at least one selected portion of the envelope of each of a series of rod-shaped products (such holes are preferably made in that portion of the envelope which surrounds the filter mouthpiece of a filter cigarette close to the adjacent end of the tobacco-containing portion), monitoring at least one variable characteristic or parameter of at least one component of each product of the aforementioned series of products and generating a first signal denoting the monitored characteristic (the first signal can denote the overall permeability of the envelope, the resistance which the body of the product offers to the axial flow of a gaseous fluid therethrough, the quantity of tobacco particles in the body, the resistance which the material of the envelope offers to penetration of light or a gaseous fluid therethrough, the resistance which the rod-like tobacco filler of the body offers to transverse flow of a gas therethrough or the extent to which successive increments of the filler absorb corpuscular radiation and/or a combination of the just-enumerated variable parameters), comparing the first signal with a reference signal, and changing the combined cross-sectional area of holes in the envelope of a product when the respective first signal deviates from the reference signal.

The monitoring step need not involve the monitoring of one or both components of the finished rod-shaped product. For example, the method may further comprise the steps of converting at least one first starting material into the envelopes of the aforementioned series of products (such starting material may constitue a web of cigarette paper, imitation cork, reconstituted tobacco or the like which is converted into the wrappers of plain cigarettes or filter rods or into discrete uniting bands which are used to connect plain cigarettes with filter mouthpieces to form filter cigars, cigarillos or cigarettes of unit length or multiple unit length), and converting at least one second starting material into the bodies of smokers' products (such second starting material may constitute natural tobacco, reconstituted tobacco, fibrous filter material, granulae of characoal or like particulate filter material or a combination of such materials). The monitoring step then comprises monitoring at least one characteristic of at least one starting material. In other words, holes can be made in the tubular envelopes of the finished products but the signals for changing (when necessary) the combined cross-sectional area of such holes can be obtained by monitoring one or more characteristics of the starting material or materials which are converted into the one and/or the other component of each product.

For example, if the first starting material is or includes a web of wrapping material, the monitoring step may comprise determining the permeability of the web prior to conversion of the web into envelopes of rod-shaped products. If the second starting material includes a rod-like filler which consists of or comprises particles of tobacco, the method further comprises the steps of draping the web around the filler and subdividing the draped filler into rod-shaped products; the aforementioned step of measuring the permeability of the web then precedes the draping step.

The step of determining the permeability of the web may comprise moving the web lengthwise along a predetermined path, establishing a pressure differential at the opposite sides of successive increments of the moving web in a predetermined portion of the path, and ascertaining the variations of the pressure differential. The first signals are then indicative of such variations (if any), and the combined cross-sectional area of holes in the respective tubular envelopes is changed accordingly.

Instead of resorting to measurement or ascertainment of the pressure differential, one can direct a beam of radiation (e.g., light) against one side of the moving web in a predetermined portion of the path along which the web moves and measure the variations of absorption and/or reflection of radiation by successive increments of the moving web. The just described measurement of absorption and/or reflection of radiation can be used in addition to or as a substitute for measurement of permeability (pressure differential) of successive increments of the web.

The aforementioned characteristic may constitute the quantity of tobacco in the bodies of rod-shaped products. For example, one can proceed as follows: The starting material for the making of the other component (the rod-shaped body of a product) may constitute a rod-like tobacco filler which is subdivided into discrete sections each of which forms part of the body of a product, and the characteristic to be monitored is the quantity of tobacco in each section of the rod-like filler. Alternatively, the rod-like filler can be moved lengthwise along a preselected path, and the monitoring step may include establishing a pressure differential at the opposite sides of a predetermined portion of the preselected path and ascertaining the variations of the pressure differential. Instead of or in addition to measuring the pressure differential at the opposite sides of successive increments of the moving filler, one can direct a beam of corpuscular radiation (e.g., beta rays) across the moving filler and measure the absorption of the beam by successive increments of the moving filler.

In order to further reduce the likelihood of deviation of the rate of flow of cool atmospheric air into the column of tobacco smoke from a desired rate, one can monitor the permeability of the web and the quantity of tobacco in the filler to generate first signals each of which is a function of the permeability of those portions of the web which constitute portions of the envelopes of the products as well as a function of the quantity of tobacco in the rod-shaped body of the respective product. Thus, discrete signals which denote the permeability of portions of the web and the quantity of tobacco in corresponding portions of the filler can be processed to form first signals which are utilized to change (when necessary) the combined cross-sectional area of holes in the respective tubular envelopes.

It is further possible to ascertain the resistance which the bodies of successive products offer to axial flow of a gaseous fluid therethrough (this can be achieved by sealingly surrounding the envelopes while causing a gaseous testing fluid to flow through the bodies of the respective products) and to generate first signals whose intensity or another characteristic is indicative of deviation of the measured resistance from a desired resistance. Instead of ascertaining the resistance of an entire body, it often suffices to ascertain the resistance of the tobacco-containing portion of the body to the axial flow of a gaseous testing fluid therethrough (such method can be resorted to when the resistance of the filter mouthpiece of a filter cigarette, cigar or cigarillo is constant or is unlikely to deviate from an optimum value).

Still further, the monitored characteristic can constitute the permeability of the tubular envelopes of successive rod-shaped products. The permeability of tubular envelopes can be ascertained after draping or prior to draping, i.e., one can monitor the permeability of successive portions of a web which, when the web is draped around a rod-like filler of tobacco and/or filter material, constitute the tubular envelopes of successive rod-shaped products. Even more accurate results for changing the combined cross-sectional area of holes can be achieved by ascertaining the permeability of envelopes of finished products or of web portions which are converted into envelopes and by further ascertaining the resistance which the rod-like bodies of products offer to axial flow of a gaseous fluid therethrough. In addition to or instead of such ascertainment of several characteristics of one or both components of each product, one can further monitor the quantity of tobacco in the body of each product and generate first signals as a function of the measured tobacco quantity as well as a function of one or more other characteristics of the first and/or second component of the product.

The step of making holes may include mechanically perforating the envelopes, removing material from envelopes by spark generation or by focusing one or more highly condensed light beams (preferably laser beams) upon the envelopes of successive products. The changing step may include varying the intensity of the beam or beams and/or varying the duration or length of intervals of focusing the beam or beams upon the envelopes.

In order to prevent the sale of unsatisfactory products to customers, the method preferably further comprises the step of measuring the rate of flow of a gaseous testing fluid (e.g., air) through the holes of envelopes of the series of products, and the additional steps of comparing the rate of flow with a predetermined range of acceptable rates and segregating from the series each product wherein the rate of flow of testing fluid through the holes of the respective envelope is outside of such range. In addition to or instead of such segregating step, the step of comparing the measured rate of flow of testing fluid through the holes of successive envelopes with a predetermined range of acceptable rates can be used to change the combined cross-sectional area of holes in the enevelopes which are produced subsequent to such comparing step.

The novel features which are considered as characteristic of the invention are set forth in particular in the appended claims. The improved apparatus itself, however, both as to its construction and its mode of operation, together with additional features and advantages thereof, will be best understood upon perusal of the following detail description of certain specific embodiments with reference to the accompanying drawing.

DESCRIPTION OF THE PREFERRED EMBODIMENTS

Figures 1, 1A:
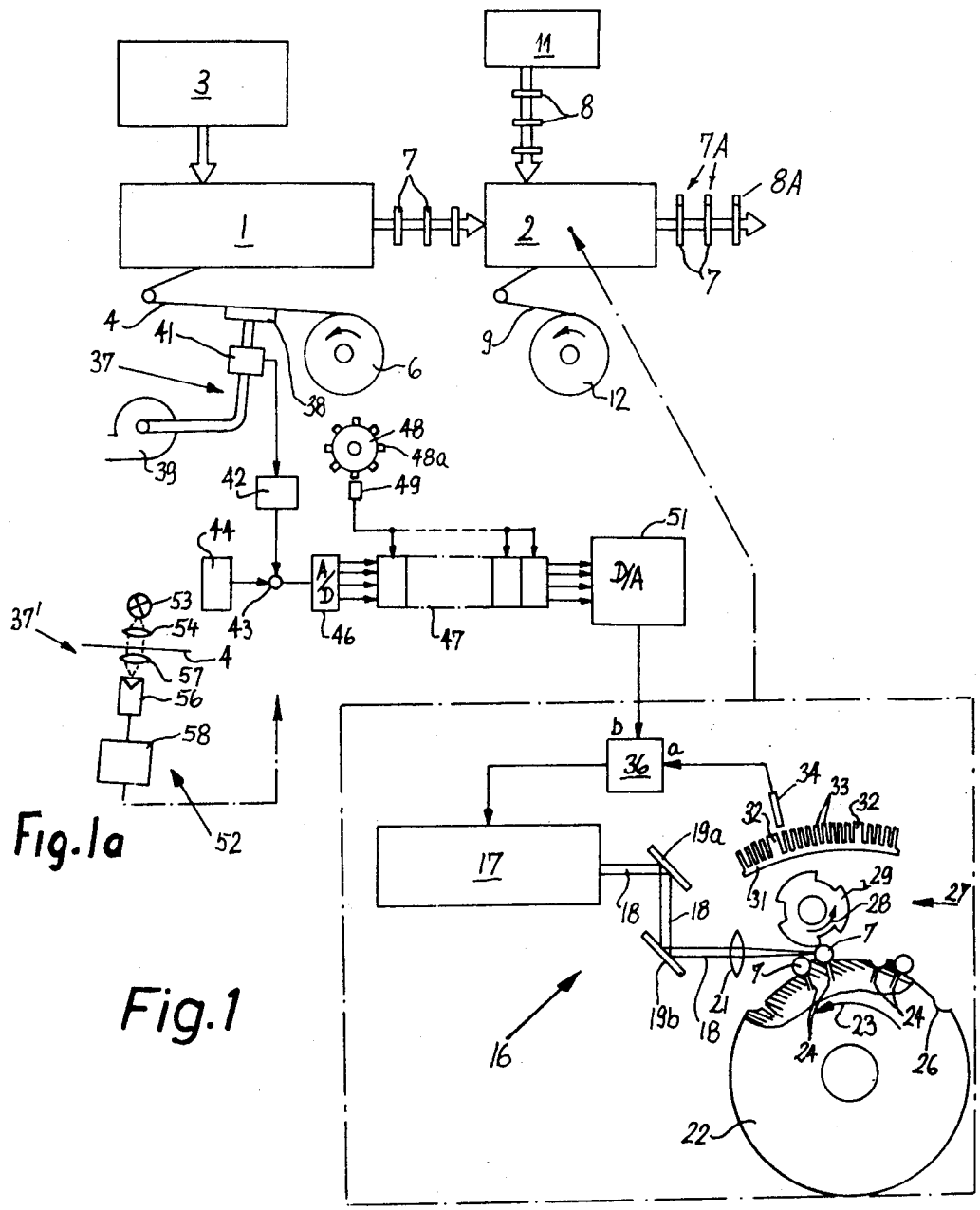
FIG. 1 is a schematic elevational view of a portion of a production line including a cigarette maker and a filter tipping machine, an enlarged partly sectional view of the perforating unit which is installed in the filter tipping machine, and a diagrammatic view of an apparatus which includes means for regulating the operation of the perforting unit in dependency on pneumatically ascertained changes of the permeability of a cigarette paper web which is fed into the cigarette maker.
FIG. 1a illustrates a portion of an apparatus which constitutes a modification of the apparatus of FIG. 1 and wherein the permeability of the web is measured by optical means.

Referring first to FIG. 1, there is shown a cigarette making machine 1 which is directly coupled with a filter cigarette making machine 2. The machine 1 receives shredded tobacco or another material of similar consistency (e.g., shreds of regenerated tobacco) from a magazine 3, and a web 4 of cigarette paper from a bobbin 6. The manner in which the machine 1 processes tobacco and cigarette paper to form a continuous cigarette rod which is thereupon subdivided into plain cigarettes 7 of unit length (or other desired length) is known. Thus, the magazine 3 delivers tobacco to a distributor which discharges a wide and relatively thin carpet of tobacco shreds and showers the leading edge of the carpet into a narrow elongated tobacco channel which confines one stretch of a foraminous tobacco transporting belt. The belt accumulates a growing tobacco stream, and the fully grown steam is thereupon trimmed to form a rod-like filler which is draped into the web 4 to form a continuous rod. The mechanism for draping the web 4 around the rod-like tobacco filler includes a paster which applies a film of adhesive to one marginal portion of the web 4, and a device which causes the adhesive of the seam of the tubular envelope of the rod to set before the rod is severed by a cutoff to yield a file of coaxial plain cigarettes 7. Such cigarettes are fed into the flutes of a drum-shaped row forming conveyor which causes them to move sideways (as shown in FIG. 1 between the machines 1 and 2) and to enter the filter cigarette It will be seen that the web 4 and the particles of tobacco which is supplied by the magazine 3 constitute the sole of the major constituents or components of the continuous cigarette rod and of the plain cigarettes 7 (the only other constituent is the adhesive which is used to bond the overlapping marginal portions of the draped web 4 to each other). A cigarette making machine of the just described type is disclosed, for example, in commonly owned U.S. Pat. No. 4,037,608 granted July 26, 1977 to Günter Wahle. The disclosure of this patent is incorporated herein by reference.

The filter cigarette making machine 2 comprises or is operatively connected with a magazine or hopper 11 for a supply of filter rod sections 8 of multiple unit length. The sections 8 are severed to yield plugs of desired length (normally plugs of two times unit length) and are combined with plain cigarettes 7 (preferably with pairs of coaxial plain cigarettes) to form filter cigarettes (normally filter cigarettes of double unit length). The means for connecting the filter plugs with cigarettes comprises adhesive coated uniting bands which are obtained by repeated severing of the leader of a web 9 consisting of cigarette paper, imitation cork or other suitable wrapping material. The web 9 is supplied by a bobbin 12. Filter cigarettes of double unit length are thereupon severed midway between their ends to yield pairs of filter cigarettes 7A of unit length (as shown in FIG. 1, each filter cigarette 7A comprises a plain cigarette 7 of unit length, a filter plug 8A of unit length and a convoluted uniting band which surrounds the plug 8A and the adjacent end portion of the plain cigarette). The cigarettes 7A are thereupon transported to storage or directly to a packing machine, not shown. A detailed description of a similar filter cigarette making machine can be found in commonly owned U.S. Pat. No. 3,951,267 granted Apr. 20, 1976 to Joachim Reuland. The disclosure of this patent is incorporated herein by reference.

The manner in which the uniting bands are converted into tubular envelopes which surround the filter plugs 8A and the adjacent end portions of the respective plain cigarettes 7 is shown in the lower right-hand portion of FIG. 1. Groups of rod-shaped articles each of which includes two plain cigarettes 7 of unit length and a filter plug of double unit length therebetween are transferred onto a draping conveyor 22 which resembles or constitutes a rotary drum and has peripheral flutes 26 communicating with suction ports 24. Each group carries an adhesive-coated uniting band which extends substantially tangentially thereof and adheres to the filter plug of double unit length and also to the adjacent inner end portions of the respective plain cigarettes. The draping conveyor 22 is driven to rotate in the direction indicated by arrow 23 and advances the groups past a rolling device 27 here shown as a drum having equally spaced peripheral projections or lobes 29 and receiving motion from the common main prime mover for the machines 1 and 2 to rotate in the direction indicated by the arrow 28. When an oncoming group is engaged by a lobe 29, it is caused to roll about its own axis along the corresponding convex facet at the periphery of the draping conveyor 22 whereby the forward progress of the group is temporarily interrupted and the uniting band is convoluted therearound to provide a fluidtight connection between the filter plug and the respective plain cigarettes. The thus obtained filter cigarettes of double unit length are severed to yield pairs of filter cigarettes 7A of unit length, and one filter cigarette of each pair is turned end-for-end so that the filter plugs 8A of all filter cigarettes 7A face in the same direction not later than when such cigarettes issue from the machine 2. A suitable turn-around device is disclosed in commonly owned U.S. Pat. No. 3,583,546 granted June 8, 1970 to Gerhard Koop.

The perforating unit 16 of the production line which includes the machines 1 and 2 of FIG. 1 comprises a laser 17 which emits one or more beams 18. such beam or beams are reflected by mirrors 19a, 19b and focused by an optical system 21 to impinge upon the uniting bands of groups in the gap between the draping conveyor 22 and rolling device 27. The laser 17 is energized at intervals so that the beam or beams 18 form one or more rows of holes or perforations which provide paths for the admission of cool atmospheric air into the column of tobacco smoke when the respective filter cigarettes 7A are lighted. Since the beam or beams 18 are focused upon successive groups while such groups rotate about their respective axes, the laster 17 forms one or more annuli of perforations, preferably close to the planes of contact between the end of a filter plug of double unit length and the respective plain cigarettes 7. The intensity of radiation issuing from the laser 17 and focused upon the group which rotates about its axis between the draping conveyor 22 and a lobe 29 of the rolling device 27 is sufficient to perforate the uniting band as well as the wrapper of the filter plug which is surrounded by the convoluted uniting band. This insures that atmospheric air can penetrate into the interior of the filter plug 8A of the cigarette 7A when the latter is lighted, i.e., that cool atmospheric air can be admixed to the column of tobacco smoke. As a rule, the wrappers of filter plugs consist of cigarette paper or similar material which can be readily combusted by laser beams. The laser beam or beams 18 need not perforate the envelopes of so-called NWA filter plugs which consist of acetate fibers and are treated by heat or otherwise to develop reinforced peripheral layers which are permeable to air.

The means for timing the activation of the laser 17 so as to burn holes into the convoluted uniting band which is located in the gap between the draping conveyor 22 and the rolling device 27 comprises a pulse generator including a ring 31 which rotates in synchronism with the conveyor 22 and comprises groups of narrow projections 33 separated by wider projections 32. The pulse generator further comprises a proximity detector 34 which transmits signals to the input a of an energizing or adjusting circuit 36 for the laser 17. The projections 32 cooperate with the proximity detector 24 to energize the laser 17 via energizing or adjusting circuit 36, and the projections 33 cooperate with the detector 34 to generate pulses which cause the laser 17 to burn discrete holes into the convoluted uniting band which rotates about its axis during engagement by one of the lobes 29.

It is assumed that the resistance which the tobacco filler of a cigarette 7 offers to the flow of a fluid (tobacco smoke and/or air) therethrough is constant. Thus, the filter cigarettes 7A will exhibit a uniform resistance (or permeability) to the flow of atmospheric air into their interior if the permeability of the envelope or wrapper of each cigarette 7A is constant. Such envelope includes the tubular wrapper of the respective plain cigarette (i.e., a portion of the web 4), a wrapper which directly surrounds the filter material of the filter plug 8A, and the convoluted uniting band. If the permeability of the web 9 which is converted into uniting bands is constant, and if the permeability of the wrapper of the filter plug 8A is also constant, the only variable which must be considered is the permeability of the web 4 which is converted into the wrappers or envelopes of plain cigarettes 7.

The apparatus which includes the perforating unit 16 further comprises means 37 for monitoring the permeability of the web 4 and for influencing the laser 17 so as to insure that the combined cross-sectional area of holes formed by the laser beam or beams 18 varies as a function of variations of permeability of the cigarette paper web 4. The monitoring means 37 ascertains the permeability of successive increments of the web 4 before the latter enters the wrapping mechanism of the cigarette making machine 1. Such monitoring means comprises a suction chamber 38 which is adjacent to one side of the path for the running web 4 and is connected with the intake of a fan 39 or an analogous suction generating device. The connection between the suction chamber 38 and the fan 39 contains a signal generating transducer 41 which converts pneumatic signals into electrical signals whose intensity or another characteristic is indicative of the rate of air flow from the chamber 38 into the intake of the fan 39, i.e., of the permeability of the respective increments of the web 4. The transducer 41 may be a diaphragm transducer, e.g., of the type disclosed in commonly owned U.S. Pat. No. 3,412,856 granted Nov. 26, 1968 to Albert Esenwein. The output signal of the transducer 41 is amplified by an amplifier 42 and is transmitted to a signal comparing stage 43 which is further connected with an adjustable potentiometer 44 or another suitable source of reference signals. The reference signal which is transmitted by the potentiometer 44 denotes the desired or optimum permeability of the paper web 4. When the measured permeability deviates from that which is denoted by the reference signal, the output of the signal comparing stage 43 transmits a signal to an analog-to-digital converter circuit 46 which is connected with the first stage of a time-delay device here shown as a shift register 47. The latter receives signal transporting pulses from a pulse generator including a disk 48 which rotates in synchronism with moving parts of the machines 1 and 2 and carries magnets 48a which actuate a proximity detector 49. The output of the detector 49 is connected with the stages of the shift register 47. The purpose of the shift register 47 is to transport signals which are transmitted by the stage 43 at the same speed at which successive increments of the web 4 advance toward the gap between the draping conveyor 22 and the rolling device 27. The last stage of the shift register 47 transmits signals to a digital-to-analog converter circuit 51 which transmits analog signals to the input b of the circuit 36. Such signals are used to adjust the intensity or duration of laser beams 18 and hence the size of holes or perforations which are formed in the uniting band between the draping conveyor 22 and a lobe 29 of the rolling device 27. The just described circuit arrangement insures that the extent to which a uniting band is perforated by one or more laser beams 18 is proportional to the permeability of corresponding portions of the web 4, i.e., to the permeability of wrappers of plain cigarettes which are disposed between the conveyor 22 and a lobe 29.

The shift register 47 is preferably designed in such a way that it comprises a row of parallel stages for each dual position of the digitalized difference signal transmitted by the signal comparing stage 43. The stages of the entire row transmit the dual signal to the stages of the next row in response to reception of a signal from the proximity detector 49. Proper timing of arrival of signals from the shift register 59 to the input b of the energizing circuit 36 is insured owing to rigid mechanical coupling of the machines 1 and 2. A shift register which is similar to the shift register 47 is disclosed, for example, in the commonly owned copending application Ser. No. 852,962 filed Nov. 18, 1977 by Uwe Heitmann et al. to which reference may be had, if necessary.

The monitoring system 37 insures that the perforating unit 16 invariably perforates the uniting bands in such a way that the rate of flow of atmospheric air into lighted filter cigarettes 7A matches a predetermined optimum value (or deviates only negligibly from such optimum value) as long as the resistance which the tobacco fillers of plain cigarettes 7 offer to axial flow of tobacco smoke is constant.

The adjustable perforating unit 16 can be replaced with another type of adjustable perforating means without departing from the spirit of the invention. For example, the unit 16 can be replaced with a mechanical perforating unit utilizing needles or like piercing or perforating elements, or with a unit including one or more adjustable spark generators for burning holes into convoluted uniting bands. Reference may be had to commonly owned U.S. Pat. No. 4,090,826 granted May 23, 1978 to Hinzmann and to commonly owned copending application Ser. No. 841,108 filed Oct. 11, 1977 by Wahle et al.

It is further within the purview of the onvention to utilize the unit 16 or a similar adjustable unit to perforate the web 9 before the latter is severed to yield discrete uniting bands. This is advisable and possible when the permeability of wrappers of the filter rod sections is constant or nearly constant. As mentioned above, certain types of filter plugs do not have discrete tubular wrappers; instead, the peripheral layers of such filter plug are chemically or thermally treated to form reinforced foraminous tubes which replace discrete wrappers consisting of cigarette paper, imitation cork or the like. Such positioning of the perforating unit is preferred, whenever possible, because the unit need not be installed in the interior of the filter cigarette making machine. The unit 16 of FIG. 1 is mounted in the machine 2.

As a rule, a web (4) of cigarette paper is porous, i.e., it permits a certain amount of atmospheric air to flow therethrough. The perforating unit 16 (or an equivalent adjustable perforating unit) makes holes which admit atmospheric air in addition to that air which flows through the pores of the web 4. The monitoring system 37 generates signals which are used to adjust the perforating unit 16 when the permeability of the web 4 deviates from (exceeds or is less than) the anticipated or desired permeability.

FIG. 1a shows a second monitoring means 37' which can ascertain the permeability of the web 4 and comprises a photoelectric scanning system 52 including a light source 53 and a lens 54 at one side of the path for the web 4 and a lens 57 and a photoelectric transducer 56 at the other side of the path. The output signal of the transducer 56 is amplified by an amplifier 58 which transmits the amplified signal to the signal comparing stage 43 (not shown in FIG. 1a). Such signal is compared with the reference signal from the potentiometer 44 and the resulting signal (if any) is transmitted to the analog-to-digital converter circuit 46 to be processed in the same way as described above. A similar optical porosity monitoring means is described in German Offenlegungsschrift No. 2,206,477.

Figures 2, 2A, 2B:
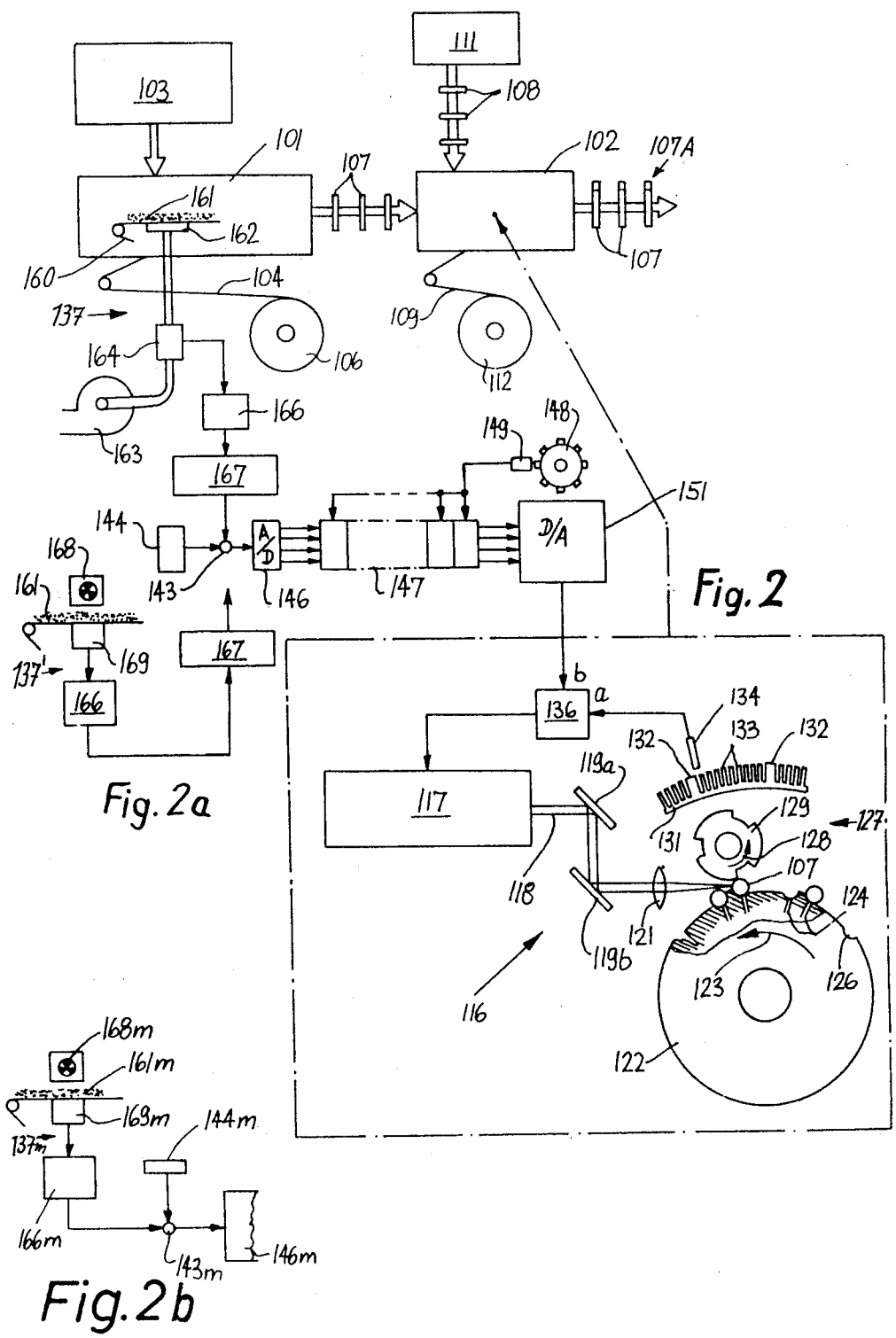
FIG. 2 illustrates the structure of FIG. 1 and a modified apparatus which regulates the operation of the perforating unit in dependency on changes of the resistance of the tobacco filler in the cigarette maker to transverse flow of a gaseous testing fluid.
FIG. 2a illustrates a portion of an apparatus which constitutes a first modification of the apparatus of FIG. 2 and which monitors the absorption of corpuscular radiation by successive increments of the tobacco filler in the cigarette maker.
FIG. 2b illustrates the apparatus of FIG. 2a and a modified connection of the absorption monitoring means with the perforating unit.

FIG. 2 shows a modified apparatus which includes means for adjusting the laser 117 of the perforating unit 116 in dependency on another variable characteristic, namely, the quantity of tobacco per unit increment of the tobacco filler rod 161 which is produced in the cigarette making machine 101. All such parts of the apparatus of FIG. 2 which are identical with or clearly analogous to corresponding parts of the apparatus of FIG. 1 are denoted by similar reference characters plus 100. The structure of FIG. 2 is utilized when the permeability of the cigarette paper web 104 is constant or is assumed to be constant.

The monitoring means 137 of FIG. 2 comprises a suction chamber 162 which is adjacent to the underside of the upper reach of a foraminous conveyor 160 serving to transport the filler 161 in the machine 101. The suction chamber 162 is connected with the intake of a fan 163 by a conduit which contains a transducer 164 for generation of electric signals whose intensity or another characteristic is proportional to the permeability of the filler 161 and hence to the quantity of tobacco per unit length of the filler. The transducer 164 may be a conventional diaphragm type transducer and its output signal is amplified by an amplifier 166 prior to transmission to the input of a signal transforming circuit 167 which stores the signals denoting the density of the filler 161 or the quantity of tobacco per unit length of the filler. The output signal of the circuit 167 denotes the resistance which the filler 161 offers to the passage of a gaseous fluid therethrough, i.e., the resistance which the fillers of the corresponding plain cigarettes 107 offer to the flow of tobacco smoke. The signal which is transmitted by the circuit 167 reaches the signal comparing stage 143 and is compared with a reference signal which is furnished by the potentiometer 144. The signal from the signal comparing stage 143 is digitalized by the circuit 146, delayed by the shift register 147, analogized by the circuit 151 and transmitted to the input b of the energizing circuit 136 for the laser 117. The signal which is transmitted by the last stage of the shift register 147 reaches the energizing circuit 136 at the time when the corresponding plain cigarette 107 is located in the gap between the draping conveyor 122 and the rolling device 127 so that the combined cross-sectional area of holes in the corresponding convoluted uniting band is increased or reduced in order to insure that the finished article (filter cigarette 107A) will permit a desired quantity of cool atmospheric air to enter the column of tobacco smoke.

The resistance which the filler of a cigarette 107 offers to the axial flow of a gaseous fluid (i.e., a mixture of air and tobacco smoke when the corresponding filter cigarette 107A is lighted) depends on the quantity of tobacco in the filler of the cigarette 107, the orientation of tobacco particles in the filler and the uniformity or lack of uniformity of distribution of tobacco particles in the filler (as considered in the axial direction of the cigarette). As a rule, the signal which denotes the quantity of tobacco per filler is a rather reliable indicator of the resistance to axial flow of gaseous fluid. The circuit 167 can be used to modify signals which are transmitted by the amplifier 166 so that the signals at the output of the circuit 167 more accurately denote the resistance of the fillers of the respective cigarettes to the axial flow of a gaseous fluid.

As mentioned above, the porosity of the web 104 is assumed to be constant or nearly constant so that the apparatus of FIG. 2 can operate properly without a monitoring means corresponding to the monitoring means 37 of FIG. 1.

A different mode of monitoring the quantity of tobacco in successive increments of the rod 161 is shown in FIG. 2a. The monitoring means 137' comprises a beta ray detector including a source 168 of corpuscular radiation at one side of the path for the rod-like filler 161 and a transducer 169 (e.g., an ionization chamber) at the other side of such path opposite the source 168. The signal which is transmitted by the output of the ionization chamber 169 is amplified by an amplifier 166' and is transmitted to the signal transforming circuit 167 instead of the signal from the amplifier 166 of FIG. 2. The circuit 167 transmits signals to the stage 143 (not shown in FIG. 2a). The extent to which successive increments of the filler 161 absorb beta rays is indicative of the density of the corresponding portions of the filler, i.e., of the quantity of tobacco in corresponding unit lengths of the filler.

The monitoring means 137 or 137' can be replaced with monitoring means of the type disclosed in commonly owned U.S. Pat. No. 3,979,581 granted Sept. 7, 1976 to Joachim Reuland. The patented monitoring means include a system for capacitive determination of the density of the filler, i.e., for determination of the quantity of tobacco per unit length of the filler.

FIG. 2b shows a modification of the monitoring means 137' of FIG. 2a. The monitoring means 137m of FIG. 2b comprises a source 168m of corpuscular radiation, an ionization chamber 169m and an amplifier 166m whose output is connected directly to the signal comparing stage 143m, i.e., the signal transforming circuit 167 is omitted. The stage 143m transmits signals to the anolog-to-digital converter circuit 146m which corresponds to the circuit 46 or 146. It will be seen that the reference signal which is furnished by the source 144m is compared directly with a signal (from the amplifier 166a) which denotes the density or quantity of tobacco in successive portions of the filler rod 161m rather than the exact resistance which the rod offers to the flow of a gas therethrough. The quantity of tobacco does not directly influence the percentage of air which enters the column of tobacco smoke (the influencing is indirect, i.e., the tobacco offers a resistance to the flow of smoke). However, the quantity of tobacco determines the percentage of certain ingredients (such as tar, nicotine and condensate) whose effect is intended to be influened by admission of cool atmospheric air. the monitoring means 137m of FIG. 2b can be used with particular advantage to influence the quantity of condensate in the column of tobacco smoke. Such quantity is controlled by adjusting the laser in dependency on variations of the quantity of tobacco per unit length of the rod 161m. In many countries, the quantity of condensate must be indicated on the packs of cigarettes. The monitoring means 137m of FIG. 2b renders it possible to reduce the quantity of condensate and/or to maintain the quantity at a constant value. It is clear that the monitoring means 137m can be used in conjunction with the monitoring means 37, 37', 137 and/or 137'.

Figure 3:
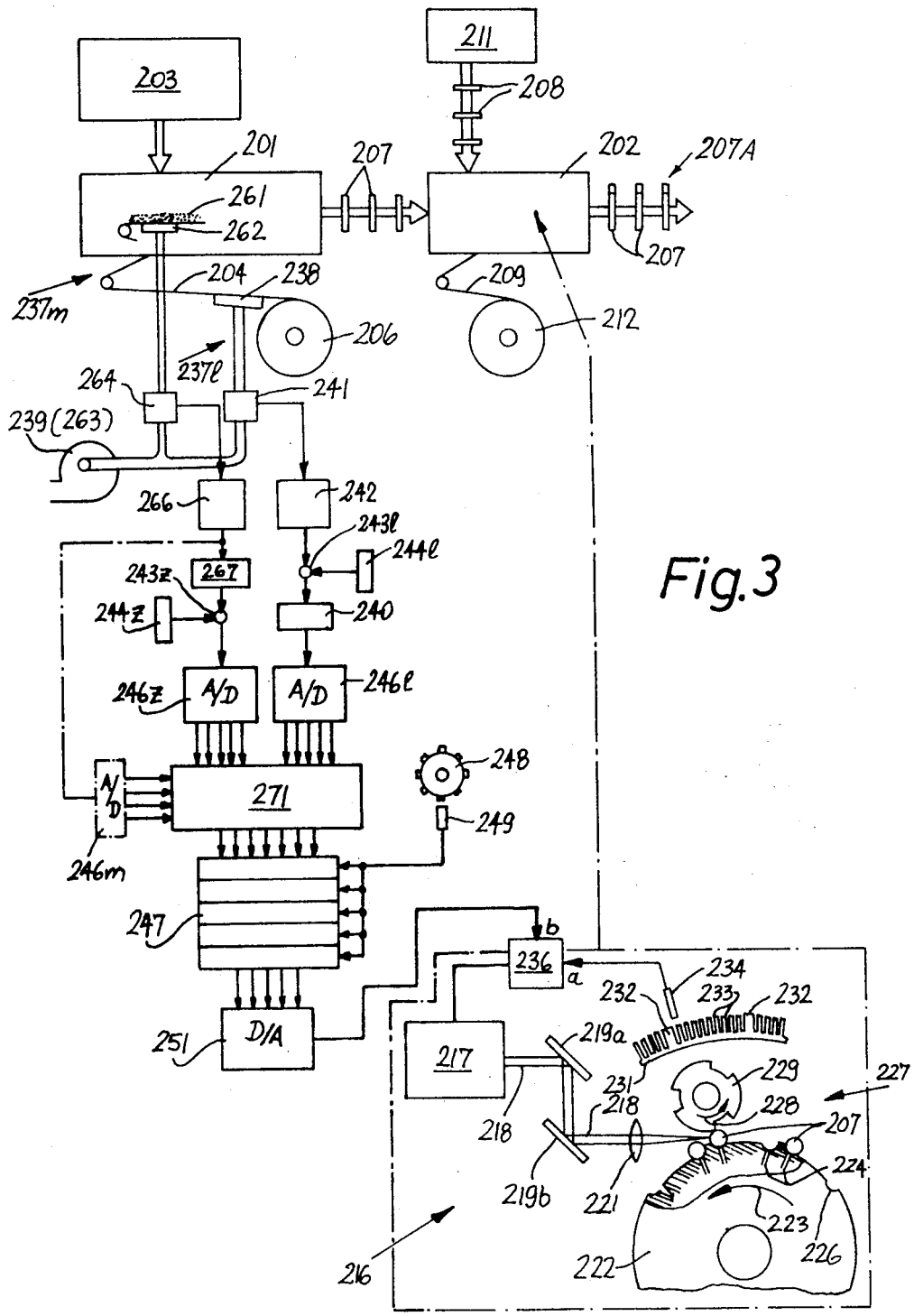
FIG. 3 illustrates the structure of FIG. 1 and a further apparatus which monitors the permeability of the cigarette paper web as well as the resistance of the tobacco filler to flow of a fluid therethrough.

FIG. 3 shows a production line wherein the perforating unit 216 receives adjusting signals from several monitoring means, namely from the monitoring means 237l which is analogous to the monitoring means 37 of FIG. 1 (and whose components, insofar as similar to or identical with the components of the monitoring means 37, are denoted by similar reference numerals plus 100 and each followed by the character l) and from the monitoring means 237m which is analogous to the monitoring means 137 of FIG. 2 and whose components, insofar as similar to or identical with the components of the monitoring means 137, are denoted by similar numerals plus 100 and each followed by the character m. The apparatus of FIG. 3 will be utilized when the plain cigarettes 207 include wrapping material (web 204) whose permeability fluctuates, and a rod-like tobacco filler 261 wherein the quantity of tobacco varies or is likely to vary from increment to increment. The reference numerals which are followed by the characters z denote parts which are used to ascertain the resistance which is offered by the rod-like tobacco filler 261 to the flow of tobacco smoke.

A signal transforming circuit 271 receives signals from the monitoring means 237m (such signals denote the resistance to the flow of gas through the filler 261 and are furnished by the signal transforming circuit 267) and from the monitoring means 237l (such signals denote the permeability of the web 204). The circuit 271 stores signals denoting the resistance to the flow of a gas and the permeability of the web. The signals which appear at the output of the circuit 271 are transmitted to the first stage of the shift register 247 to reach the input b of the energizing circuit 236 simultaneously with arival of corresponding plain cigarettes 207 into the gap between the draping conveyor 222 and the rolling device 227. The perforating unit 216 is adjusted to insure adequate ventilation of filter cigarettes 207A regardless of deviations of the permeability of the wrappers of such cigarettes from a norm and/or regardless of deviations of the resistance of the fillers of such cigarettes from a predetermined resistance.

Since the monitoring unit 237l is not immediately adjacent to the monitoring unit 237m, the structure of FIG. 3 further comprises means for delaying the signals which are transmitted by the monitoring means 237l to account for the interval of time which is necessary to advance a unit length of the web 204 from the suction chamber 238 to the suction chamber 262. Such delay is preferably effected by resorting to an analog or digital shift register which receives signal transporting pulses in synchronism with the speed of movement of the web 204 in the cigarette making machine 201. The shift register is shown schematically at 240.

The structure of FIG. 3 can be modified by the provision of an additional analog-to-digital converter circuit 246m which is connected between the output of the amplifier 266 and the corresponding input of the signal transforming circuit 271. The function of the converter circuit 246m is the same as that of the circuit 146m in FIG. 2b. Thus, the signal which is furnished by the converter circuit 246m denotes the quantity of tobacco per unit length of the rod 261. The signal transforming circuit 271 is designed to furnish an output signal which is a function of input signals received from the converter circuits 246z, 246l and 246m; such output signal is used to influence the operation of the perforating unit 216, i.e., to regulate the unit 216 in such a way that the ratio of cool atmospheric air to tobacco smoke is a function of all variable characteristics which are monitored by the monitoring means 237m, 237z and 237l.

Figure 4:
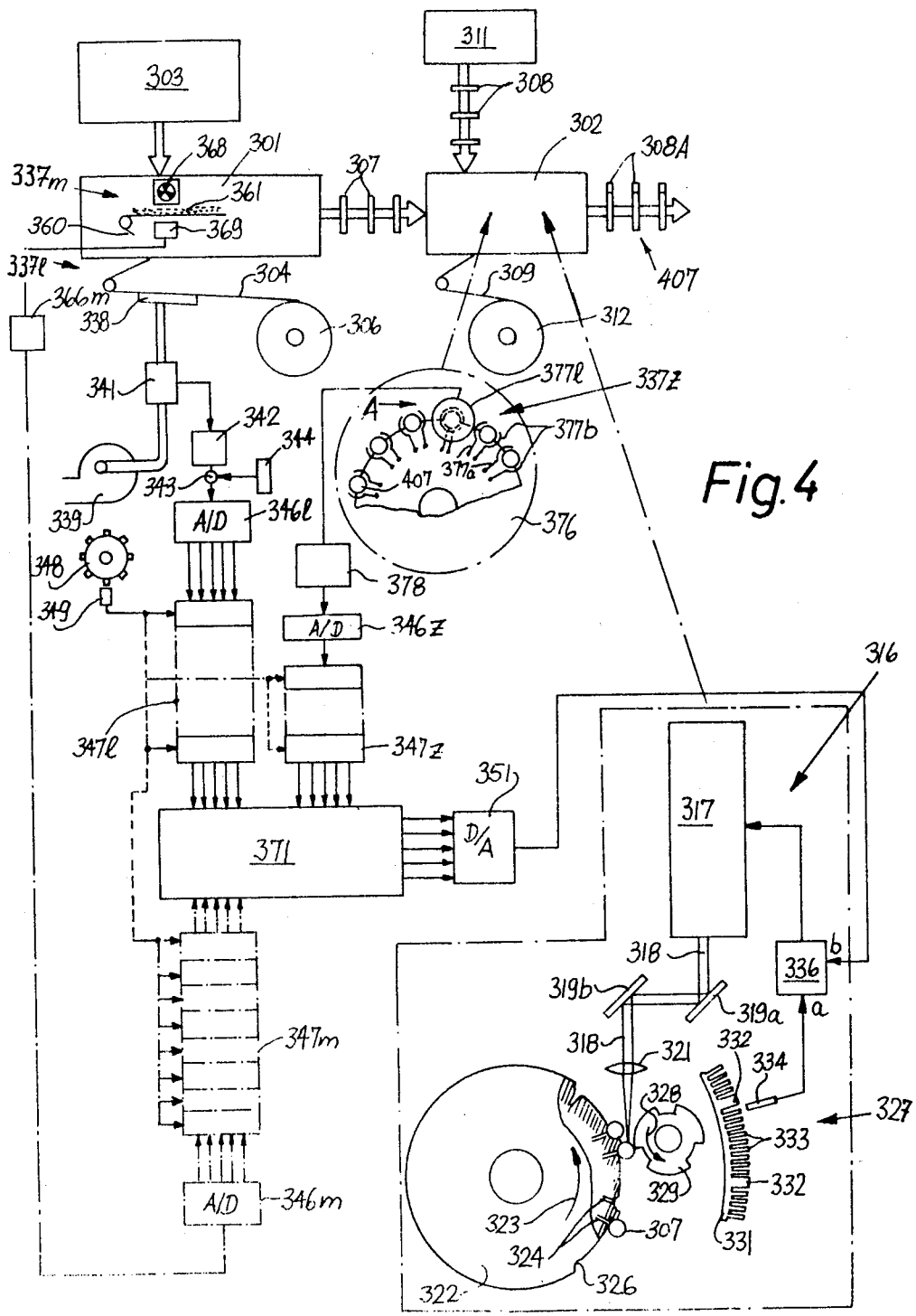
FIG. 4 illustrates the structure of FIG. 1 and a further apparatus which monitors the same characteristics as the apparatus of FIGS. 1 and 2, 2a or 2b as well as the resistance which the rod-lik bodies of successive smokers' products offer to axial flow of a gaseous fluid therethrough.

The structure of FIG. 4 includes a testing device for filter cigarettes, i.e., for the finished rod-shaped smokers' products. The testing device furnishes signals indicating the resistance which is offered to the flow of gas through the rod-shaped bodies of the respective filter cigarettes, i.e., the signals are accurately indicative of the resistance which the tobacco filler and the filter plug(s) of a finished product offer to the flow of tobacco smoke therethrough when the product is lighted. Many parts which are shown in FIG. 4 correspond to previously described parts (especially those shown in FIGS. 2 and 3) and are denoted by similar reference characters plus 300 or 200 or 100. the same applies for the characters l, m and z.

The signals denoting the permeability of the wrappers of plain cigarettes 307 are generated in the same way as described in connection with FIGS. 1 and 3, i.e., by ascertaining the permeability of successive increments of the cigartte paper web 304. Such signals are delayed by a shift register 347l so that they reach the energizing circuit 336 when the corresponding cigarettes 307 reach the gap between the draping conveyor 322 and the rolling device 327. However, instead of or in addition to monitoring the resistance which the filler 361 offers to transverse flow of a gas therethrough, or in addition to such monitoring, the apparatus of FIG. 4 comprises a testing or monitoring means 337z which transmits signals denoting the resistance which is offered by successive filter cigarettes 407 to axial flow of a gas through the interior of their wrappers.

The monitoring means 337z comprises a drum-shaped testing conveyor 376 which is installed in the filter cigarette making machine 302 and is located ahead of the draping conveyor 322. The conveyor 376 carries pairs of pivotable sealing elements 337a, 337b which sealingly engage the wrappers at the testing station A so that the pressure or another characteristic of a stream of gaseous testing fluid which is blown or sucked axially through the tested cigarette 407 depends exclusively from the resistance of the filler. In other words, the permeability or lack of permeability of the envelope of the cigarette 407 does not influence the measurement of resistance which the confined rod-like body of such cigarette offers to the axial flow of testing fluid. A testing conveyor which can be used in the monitoring means 337z is disclosed in commonly owned U.S. Pat. No. 3,339,402 to Rudszinat, and the manner in which the testing fluid is admitted and monitored is disclosed in commonly owned U.S. Pat. No. 3,408,858 to Esenwein. The transducer 378 of the monitoring means 337z converts pneumatic signals into electrical signals and transmits such signals to an analog-digital converter 346z. Each electrical signal denotes the resistance of the filler of the respective plain cigarette or filter to axial flow of testing fluid. The signals at the output of the converter 346z are delayed by a shift register 347z so that they reach the energizing circuit 336 when the respective cigarettes are located between the draping conveyor 322 and rolling device 327. Signals which are transmitted by the output of the converter 346z reach the input b of the circuit 336 via signal transforming circuit 371 and a digital-analog converter 351.

Signals which are transmitted to the input b of the energizing circuit 336 are further modified by signals which are transmitted by the monitoring means 337m, i.e., by signals denoting the absorption of radiation by successive increments of the continuous tobacco filler 361 on the foraminous conveyor 360. The manner of monitoring is the same as described in connection with FIG. 2b. signals which are transmitted by the amplifier 336m are digitalized by the converter 346m and delayed by the shift register 347m.

It will be noted that the outputs of the circuit 371 transmit signals which are influenced by absorption of radiation by the filler 361, by resistance of the fillers of cigarettes 407 to axial flow of a testing fluid, and by the permeability of the cigarette paper web 304. The perforating unit 316 is adjusted accordingly so that the permeability of the wrappers of finished articles matches the desired value. It is clear that the circuit 371 can receive signals from one or more additional monitoring means or that the monitoring means 337z can test plain cigarettes 307 in the machine 301.

Figure 5:
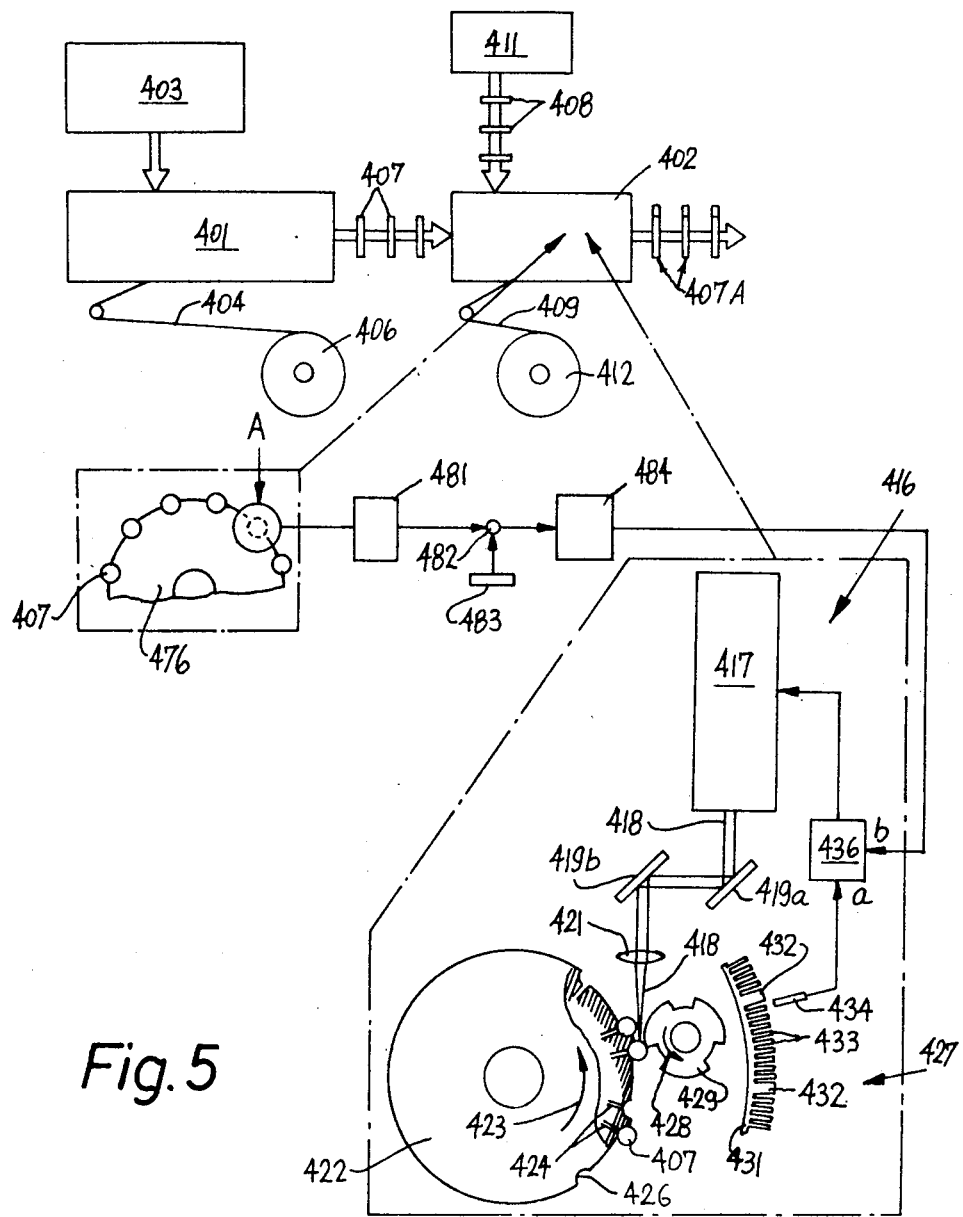
FIG. 5 illustrates the structure of FIG. 1 and an apparatus which regulates the operation of the perforating unit in dependency on the overall permeability of tubular wrappers of successive rod-shaped products.

The apparatus of FIG. 5 differs from the apparatus of FIG. 4 in that a testing unit including a drum-shaped conveyor 476 monitors the permeability of the tubular envelopes of finished articles 407 and transmits appropriate signals to a transducer 481 which, in turn, transmits electric signals to a signal comparing stage 482. Such signals are compared with reference signals transmitted by a source 483 and the stage 482 transmits signals when the intensity or another characteristic of signals from 481 does not match the intensity of signals from the source 483. Such signals are delayed by a time-delay device 484 prior to transmission to the input b of the energizing circuit 436 for the laser 417. All such parts of the apparatus of FIG. 5 which are identical with or analogous to corresponding parts of the apparatus of FIG. 4 are denoted by similar reference characters plus 100.

Successive articles 407 are tested at the station A by a gaseous testing fluid which is admitted into one end of each article by way of a flow restrictor. Pneumatic signals which denote the permeability of the envelopes of articles 407 are transmitted to the aforementioned transducer 481 for conversion into electrical signals of corresponding intensity. The transducer 481 preferably constitutes or embodies an amplifier for electrical signals; such signals are indicative of the quantity of testing fluid which has escaped form the interior of the respective articles 407. The time-delay device 484 may constitute a shift register. A testing unit which can be utilized in the apparatus of FIG. 5 is disclosed in detail in commonly owned U.S. Pat. No. 3,575, 041 granted Apr. 13, 1971 to Uwe Heitmann. The testing operation may include drawing air from one end of the envelope and sealing the other end of the envelope. The quantity of air which leaves the envelope via one end is indicative of the permeability of the envelope.

Figure 6:
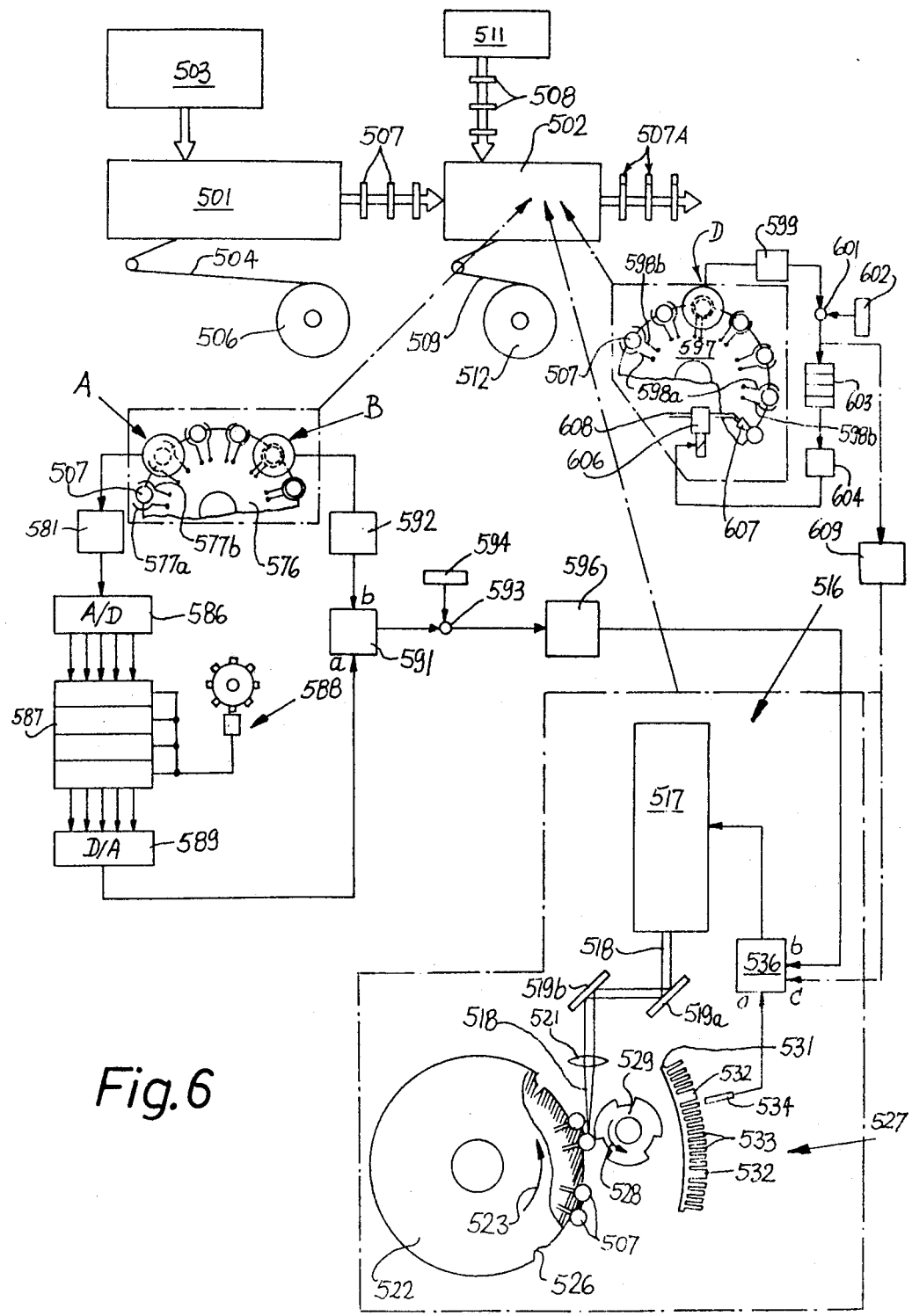
FIG. 6 illustrates the structure of FIG. 1 and an apparatus which regulates the operation of the perforating unit in dependency on the resistance of rod-like bodies of successive products as well as in dependency on the overall permeability of the envelopes of successive products.

The apparatus of FIG. 6 embodies the features of the apparatus of FIG. 5 and certain features of the apparatus of FIG. 4. This apparatus comprises two testing units, namely, a testing unit with a drum-shaped conveyor 576 wherein the rod-like bodies or fillers of finished articles 507 are tested to determine their resistance to axial flow of a gaseous testing fluid therethrough, and a second testing unit including a drum-shaped conveyor 597. This second testing unit ascertains the rate at which atmospheric air can flow through perforations which are formed by the laser beam or beams 518. All such parts of the apparatus of FIG. 6 which are respectively identical with or analogous to the parts shown in FIGS. 4 and 5 are denoted by similar reference characters plus 100 and 200. The testing unit including the conveyor 597 transmits signals which reach the energizing circuit 536 and which are further used for segregation of defective finished articles 507 from satisfactory articles.

The testing unit including the conveyor 576 defines a first testing station A where the envelopes of cigarettes 507 are tested for permeability (this testing station corresponds to the station A of FIG. 5). The sealing elements 577a, 577b are retracted or inoperative during travel past the station A of FIG. 6 so that testing fluid which is admitted into at least one end of each article 507 can escape through the pores of the tubular envelope. The drop in pressure of testing fluid is ascertained by the transducer 581 which transmits amplified electric signals to an analog-digital converter 586. The later transmits signals to a shift register 587. The signals which are transmitted by the last stage of the shift register 587 are analogized by a converter 589 and are transmitted to the input a of a signal transforming circuit 591. The mode of testing at the station A of FIG. 6 is preferably such that an article which reaches this station receives pressurized testing fluid at both ends. The shift register 587 cooperates with a pulse generator 588 to transport the signals from the converter 586 to the converter 589 at the rate at which the respective cigarettes advance toward the gap between the draping conveyor 522 and rolling device 527. The shift register 587 has four stages because the distance between the testing station A and a second testing station B in the testing unit or monitoring means including the conveyor 576 is four times the distance between the centers of two neighboring articles 507 on the conveyor 576. Thus, the input a of the circuit 591 receives a signal simultaneously with transmission of a signal to the input b whereby the signal which is transmitted to the input b denotes the resistance which the same article 507 offers to axial flow of testing fluid through its tobacco filler. Such resistance is measured at the station B which corresponds to the station A of FIG. 4. During travel past the station B of FIG. 6, the sealing elements 577a, 577b are moved to operative positions so that they prevent escape of testing fluid through the envelope of the article 507. Pneumatic signals denoting the resistance of the filler to axial flow of testing fluid are transmitted to a transducer 592 which transmits amplified electrical signals to the input b of the circuit 591 simultaneously with arrival of delayed signals (denoting the permeability of the envelope of the same article 507) at the input a of 591. The modulated signal at the output of the circuit 591 is proportional to the signals which are received at the inputs a and b, and is transmitted to a signal comparing stage 593 for comparison with a reference signal which is transmitted by a source 594 (e.g., an adjustable potentiometer). If the two signals are not identical, the stage 593 transmits a signal which is delayed by a shift register 596 before reaching the input b of the energizing circuit 536. The delay which is caused by the shift register 596 is identical with the interval which is required to move an article 507 from the testing station B to the gap between the draping conveyor 522 and the rolling device 527. If the station B is located close to the gap between 522 and 527, the circuit 596 is an amplifier or is omitted.

If desired, the apparatus of FIG. 6 may comprise additional monitoring means similar to the monitoring means of FIG. 2b. The circuit 591 then receives three different signals, namely, the aforediscussed signals from the transducers 581 and 592 as well as a signal which denotes the absorption of corpuscular radiation by successive increments of the filler in the cigarette making machine 501.

The testing unit or monitoring means including the conveyor 597 determines the diameters of holes which are formed by the laser beam or beams 518. The conveyor 597 is provided with sealing elements 598a, 598b which are movable to operative positions in which they sealingly surround the entire envelope of a filter cigarette 507a with the exception of that portion which has holes provided by the laser beam or beams 518. A transducer 599 receives pneumatic signals which denote the combined cross-sectional area of holes in the envelope between the elements 598a, 598b at the testing station D, and the transducer 599 transmits corresponding electric signals to a signal comparing stage 601 which further receives a reference signal from a suitable source 602. When the signals from transducer 599 deviate from the reference signal, the output of the signal comparing means 601 transmits a signal to the first stage of a shift register 603. The last stage of the shift register 603 transmits the delayed signal to an amplifier 604 which energizes the solenoid of a normally closed valve 606 in a conduit 608 connecting a source of compressed fluid (e.g., air) with an ejector nozzle 607. The nozzle 607 discharges a stream of compressed fluid to thus segregate the corresponding cigarette 507A from satisfactory filter cigarettes. In the embodiment of FIG. 6, the shift register 603 has four stages because the ejector nozzle 607 is adjacent to the fourth flute of the conveyor 597 downstream of the testing station D (the conveyor 597 is rotated clockwise, as viewed in FIG. 6).

If the signal which is transmitted by the transducer 599 denotes that the combined cross-sectional area of holes in the envelope of the cigarette 507A at the station D is the same as that denoted by the reference signal from the source 602, such signal should match the (satisfactory) signal which is transmitted to the input b of the adjusting circuit 536. In other words, the signal at the output of the stage 601 should indicate that the perforating unit 516 is properly adjusted in response to a signal from the shift register 596.

The apparatus of FIG. 6 further comprises an integrating circuit 609 which is connected to the output of the stage 601 and transmits a correction signal to an input c of the adjusting circuit 536 when the sum of signals denoting deviations of signals transmitted by the transducer 599 from the reference signal transmitted by the source 602 reaches a preselected value which warrants an adjustment of the perforating unit 516. Such correction signal can compensate for long-range deviations of the ratio of atmospheric air to tobacco smoke from the desired ratio or range of ratios. Thus, the perforating unit 516 can be regulated by a follow-up monitoring means (testing unit including the conveyor 597) to insure that the combined cross-sectional area of holes in the envelopes of smokers' products 507A cannot deviate from an optimum combined cross-sectional area for extended intervals of time.

Though it is equally possible to transmit each and every "defect" signal directly from the signal comparing stage 601 to the input c of the adjusting or energizing circuit 636, the provision of integrating circuit 609 or an analogous circuit is preferred at this time because the adjustments of the laser 517 are less frequent. Furthermore, adjustments of the laser 517 via signals which are transmitted to the input c of the circuit 636 suffice to eliminate gradual long-range deviations of the combined cross-sectional area of holes in successive envelopes from an optimum range of combined cross-sectional areas.

Figure 7:
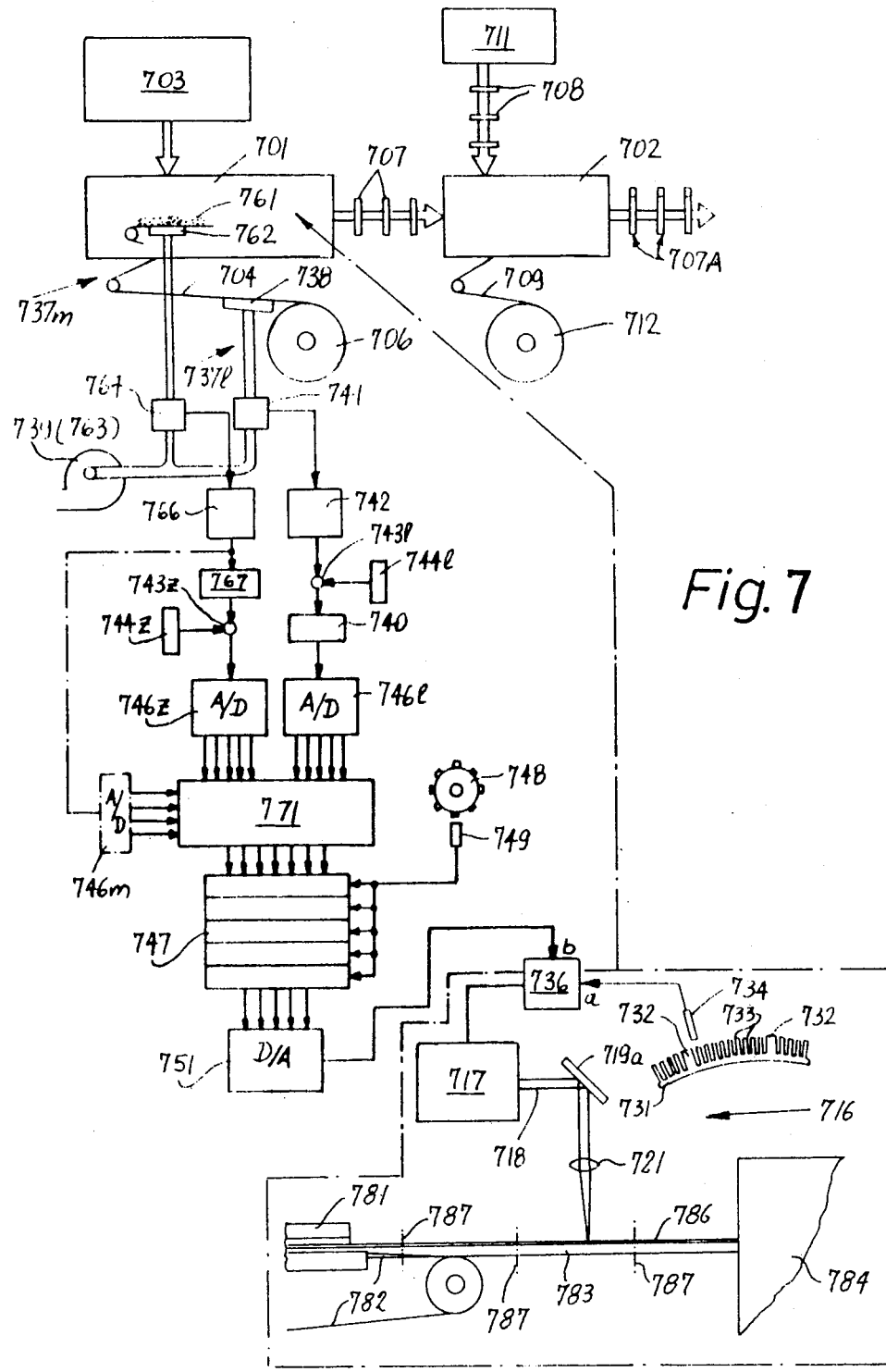
FIG. 7 illustrates the structure of FIG. 1 and an apparatus which regulates the operation of the perforating unit in dependency on measurements of the quantity of tobacco in successive products and the permeability of the web, the perforating unit being installed in the cigarette maker.

The apparatus of FIG. 7 differs from the previously described apparatus in that the perforating unit 716 is installed in or combined with the maker 701 of plain cigarettes 707. The laser beam 718 which issues from the laser 717 is focused upon the tubular wrapper or envelope of a continuous cigarette rod 783 which is formed by draping the continuous tobacco filler 761 into the web 704 in a wrapping mechanism including an endless belt conveyor 782 known as garniture. The seam 786 of the envelope which forms part of the continuous rod 783 is heated or cooled by a customary sealer 781 (depending upon whether the adhesive which is used to form the seam is a wet adhesive or a hotmelt), and the rod 783 is thereupon severed at regular intervals by a cutoff 784 to yield a file of discrete plain cigarettes 707. The planes in which the rod 783 is severed by the orbiting knife or knives of the cutoff 784 are indicated by phantom lines, as at 787. The plain cigarettes 707 can be transported directly to a packing machine (not shown) or to the filter tipping machine 702 which is shown in the upper part of FIG. 7. FIG. 7 further shows that the beam 718 is focused upon the seam 786 of the continuous cigarette rod 783.

All such parts of the apparatus of FIG. 7 which are not specifically mentioned correspond to those shown in FIG. 3 and are designated by similar reference characters plus 400.

The signal transforming circuit 771 transmits signals to the input b of the adjusting or energizing circuit 736 for the laser 717 by way of a shift register 747 and a digital-to-analog converter 751. The shift register 747 delays the signals which are transmitted by the analog-to-digital converters 746m, 746z and 746l and are modified by the signal transforming circuit 771. The converter 746m receives signals which are furnished by a monitoring means 737m serving to ascertain the quantity of tobacco in successive increments of the filler 761; such signals are modified by a signal transforming circuit 767 so that each signal which reaches the input of the converter 747z denotes the resistance which the respective portion of the filler 761 offers to the flow of a gaseous fluid. The converter 746l receives signals which are transmitted by the monitoring means 737l and denote the porosity of successive increments of the cigarette paper web 704. The delay which is effected by the shift register 747 is such that the adjusting circuit 736 energizes the laser 717 in synchronism with arrival of corresponding web portions and filler portions at the perforating station where the beam 718 impinges upon the seam 786 of the running cigarette rod 783. A further shift register 740 is provided between the transducer 741 of the monitoring means 737*l* and the analog-to-digital converter 746*l* to delay the signals denoting the porosity of successive increments of the web 704 because such porosity is measured ahead of the suction chamber 762 in the monitoring means 737*m*.

The analog-to-digital converter 746*m* is optional; therefore, this circuit and the corresponding leads are denoted by phantom lines. As mentioned above, the converter 746*m* transmits signals which denote the quantity of tobacco in successive increments of the filler 761.

The projections 732 of the ring 731 cooperate with the proximity detector 734 to transmit signals which denote the start of a perforating operation, i.e., the start of making a row of holes in a portion of the rod 783 between two lines 787 (such portion constitutes a plain cigarette 707 when it moves beyond the cutoff 784). The individual impulses are triggered by the projections 733 in cooperation with the proximity detector 734. The combined cross-sectional area of holes which are burned into the envelope of a cigarette 707 can be adjusted by changing the intensity of the beam 718 or the duration of impingement of the beam upon the seam 786 in response to each such signal which is generated when a projection 733 moves past the proximity detector 734.

The apparatus of FIG. 7 can be modified in a number of ways without departing from the spirit of the invention. For example, the apparatus can be simplified by adjusting the perforating unit 716 in dependency on monitoring of only two or only one characteristic of a component of each cigarette 707 or a starting material for the one or the other component. Thus, the adjusting or energizing circuit 736 can receive signals only from the monitoring means 737*m*, 737*l* or 737*z*, or from any combination of two of these monitoring means. Furthermore, the laser beam 718 can be focused upon discrete plain cigarettes 707 downstream of the cutoff 784. Such focusing can take place in the cigarette maker 701 or in the filter tipping machine 702.

The apparatus of the present invention can be further modified by resorting to a weighing device as a substitute for the monitoring means 137 of FIG. 2 and similar monitoring means. The weighing device could be installed between the machines 101 and 102 of FIG. 2 to transmit signals denoting the weight and hence the quantity of tobacco in each plain cigarette 107. Such signals would be compared with the reference signal from the source 144. Moreover, and as already mentioned above, the quantity of tobacco in the filler of the cigarette rod or in the fillers of discrete cigarettes can be ascertained by resorting to capacitive monitoring means. Such capacitive monitoring means can include means for establishing a high-frequency a-c field which is traversed by the moving filler.

Lasers constitute the presently preferred perforating elements of perforating units in our apparatus because the intensity and/or duration of laser beams can be regulated at a high frequency and with a high degree of accuracy. Thus, the laser beam or beams can be readily controlled to change the size and/or shape of holes in the envelopes of rod-shaped smokers' products.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is:

1. A method of increasing the permeability of tubular envelopes of cigarettes or analogous rod-shaped smokers' products wherein the envelope constitutes one component of the product and surrounds at least one rod-like body which constitutes another component of the product, comprising the steps of making holes in at least one selected portion of the envelope of each of a series of rod-shaped products; monitoring at least one variable characteristic of at least one component of each product of said series prior to said step of making holes; generating a first signal denoting the monitored characteristic; comparing the first signal with a reference signal; and changing the combined cross-sectional area of holes in the envelope of a product when the respective first signal deviates from said reference signal.

2. A method as defined in claim 1, further comprising the steps of converting at least one first starting material into the envelopes of said series of products and converting at least one second starting material into the bodies of said products, said monitoring step comprising monitoring at least one characteristic of at least one of said starting materials.

3. A method as defined in claim 2, wherein said first starting material includes a web of wrapping material and said variable characteristic is the permeability of said web, said monitoring step comprising monitoring the permeability of said web prior to conversion into envelopes of said series of products.

4. A method as defined in claim 3, wherein said second starting material includes a rod-like filler consisting at least in part of tobacco particles, and further comprising the steps of draping said web around said filler and subdividing the draped filler into said products.

5. A method as defined in claim 3, wherein said monitoring step comprises moving said web lengthwise along a predetermined path, establishing a pressure differential at the opposite sides of successive increments of the moving web in a portion of said path, and ascertaining the variations of said pressure differential.

6. A method as defined in claim 1, wherein said monitoring step comprises ascertaining the permeability of finished envelopes of said series of products.

7. A method as defined in claim 1, wherein said step of making holes comprises focusing at least one beam of condensed radiation upon the envelopes of said series of products.

8. A method as defined in claim 7, wherein said beam is a laser beam.

9. A method as defined in claim 7, wherein said changing step comprises varying the intensity of said beam.

10. A method as defined in claim 7, wherein said changing step comprises varying the duration of focusing of said beam upon the envelopes of said series of products.

11. A method as defined in claim 1, wherein said characteristic is the permeability of envelopes of said series of products.

12. A method of increasing the permeability of tubular envelopes of cigarettes or analogous rod-shaped smokers' products wherein the envelope constitutes one component of the product and surrounds at least one rod-like tobacco-containing body which constitutes another component of the product, comprising the steps of making holes in at least one selected portion of the envelope of each of a series of rod-shaped products; monitoring the quantity of tobacco in the bodies of said series of products; generating a first signal denoting the monitored quantity; comparing the first signal with a reference signal; and changing the combined cross-sectional area of holes in the envelope of a product when the respective first signal deviates from said reference signal.

13. A method as defined in claim 12, further comprising the step of converting a continuous rod-like tobacco filler into discrete sections each of which forms part of the body of one of said series of products, said characteristic being the quantity of tobacco in the sections of said filler.

14. A method as defined in claim 13, wherein said converting step comprises moving said filler lengthwise along a predetermined path and said monitoring step comprises establishing a pressure differential at the opposite sides of said filler in a predetermined portion of said path and ascertaining the variations of said pressure differential.

15. A method as defined in claim 13, wherein said converting step comprises moving said filler lengthwise along a predetermined path and said monitoring step comprises directing a beam of corpuscular radiation across the moving filler in a predetermined portion of said path and measuring the absorption of radiation by successive increments of the moving filler.

16. A method of increasing the permeability of tubular envelopes of cigarettes or analogous rod-shaped smokers' products wherein the envelope constitutes one component of the product and surrounds at least one rod-like body which constitutes another component of the product, comprising the steps of making holes in at least one selected portion of the envelope of each of a series of rod-shaped products; monitoring at least one variable characteristic of at least one component of each product of said series; generating a first signal denoting the monitored characteristic; comparing the first signal with a reference signal; changing the combined cross-sectional area of holes in the envelope of a product when the respective first signal deviates from said reference signal; and measuring the rate of flow of a gaseous testing fluid through the holes of envelopes of said series of products.

17. A method as defined in claim 16, further comprising the step of comparing said rate with a predetermined range of acceptable rates and segregating from said series each such product wherein the rate of flow of testing fluid through the holes of the respective envelope is outside of said range.

18. A method as defined in claim 16, further comprising the step of comparing said rate with a predetermined range of acceptable rates and adjusting said changing step when the rate of flow of testing fluid through the holes of at least one envelope is outside of said predetermined range.

19. A method of increasing the permeability of tubular envelopes of cigarettes or analogous rod-shaped smokers' products wherein the envelope constitutes one component of the product and surrounds at least one rod-like body which constitutes another component of the product, comprising the steps of converting at least one first starting material into the envelopes of a series of rod-shaped products, said first starting material including a web of wrapping material; converting at least one second starting material into the bodies of said products; making holes in at least one selected portion of the envelope of each of said series of rod-shaped products; monitoring the permeability of said web prior to conversion into envelopes of said series of products, including moving said web lengthwise along a predetermined path, directing a beam of radiation against one side of the moving web in a predetermined portion of said path, and ascertaining the variations of absorption or reflection of radiation by successive increments of the moving web; generating a first signal denoting the monitored permeability; comparing the first signal with a reference signal; and changing the combined cross-sectional area of holes in the envelope of a product when the respective first signal deviates from said reference signal.

20. A method of increasing the permeability of tubular envelopes of cigarettes or analogous rod-shaped smokers' products wherein the envelope constitutes one component of the product and surrounds at least one rod-like body which constitutes another component of the product, comprising the steps of converting a web of wrapping material into at least a portion of the envelope of each of a series of rod-shaped products; converting a continuous rod-like tobacco filler into at least a portion of the body of each of said series of products; making holes in at least one selected portion of the envelope of each of said series of rod-shaped products; monitoring the permeability of said web and the quantity of tobacco in said filler; generating first signals denoting the monitored permeability and quantity; including generating discrete signals respectively denoting the permeability of those portions of said web which constitute portions of the envelopes of said series of products and the quantity of tobacco in those portions of said filler which constitute portions of the bodies of said series of products, and utilizing said discrete signals for the generation of the corresponding first signals; comparing said first signals with a reference signal; and changing the combined cross-sectional area of holes in the envelope of a product when the respective first signal deviates from said reference signal.

21. A method of increasing the permeability of tubular envelopes of cigarettes or analogous rod-shaped smokers' products wherein the envelope constitutes one component of the product and surrounds at least one rod-like body which constitutes another component of the product, the body of each product including a rod-like tobacco filler, comprising the steps of making holes in at least one selected portion of the envelope of each of a series of rod-shaped products; monitoring the resistance which said fillers offer to axial flow of a gaseous fluid through the respective products; generating a first signal denoting the monitored resistance; comparing the first signal with a reference signal; and changing the combined cross-sectional area of holes in the envelope of a product when the respective first signal deviates from said reference signal.

22. A method of increasing the permeability of tubular envelopes of cigarettes or analogous rod-shaped smokers' products wherein the envelope constitutes one component of the product and surrounds at least one rod-like body which constitutes another component of the product, comprising the steps of making holes in at least one selected portion of the envelope of each of a series of rod-shaped products; monitoring the resistance which said bodies of said series of products offer to the axial flow of a gaseous fluid through the respective products; generating a first signal denoting the monitored resistance; comparing the first signal with a reference signal; and changing the combined cross-sectional area of holes in the envelope of a product when the respective first signal deviates from said reference signal.

23. A method of increasing the permeability of tubular envelopes of cigarettes or analogous rod-shaped smokers' products wherein the envelope constitutes one component of the product and surrounds at least one rod-like body which constitutes another component of the product, the body of each product containing particles of tobacco, comprising the steps of making holes in at least one selected portion of the envelope of each of a series of rod-shaped products monitoring the quantity of tobacco in the bodies of said series of products; generating a first signal denoting the monitored quantity; comparing the first signal with a reference signal; and changing the combined cross-sectional area of holes in the envelope of a product when the respective first signal deviates from said reference signal.

24. A method of increasing the permeability of tubular envelopes of cigarettes or analogous rod-shaped smokers' products wherein the envelope constitutes one component of the product and surrounds at least one rod-like body which constitutes another component of the product, comprising the steps of converting a web of wrapping material into the envelopes of said series of products; making holes in at least one selected portion of the envelope of each of said series of rod-shaped products; monitoring the permeability of envelopes of said series of products, including ascertaining the permeability of those portions of said web which, upon completion of said converting step, constitute the envelopes of said series of products; generating a first signal denoting the monitored permeability; comparing the first signal with a reference signal; and changing the combined cross-sectional area of holes in the envelope of a product when the respective first signal deviates from said reference signal.

25. A method of increasing the permeability of tubular envelopes of cigarettes or analogous rod-shaped smokers' products wherein the envelope constitutes one component of the product and surrounds at least one rod-like body which constitutes another component of the product, comprising the steps of making holes in at least one selected portion of the envelope of each of a series of rod-shaped products; monitoring the permeability of envelopes of said series of products, including ascertaining the permeability of the envelopes of said series of products and the resistance which the bodies of said series of products offer to the flow of a gaseous fluid therethrough; generating a first signal denoting the monitored permeability of the envelopes, including generating said first signals as a function of the permeability of envelopes as well as a function of the resistance of corresponding bodies of said series of products; comparing the first signals with a reference signal; and changing the combined cross-sectional area of holes in the envelope of a product when the respective first signal deviates from said reference signal.

26. Apparatus for increasing the permeability of tubular envelopes of cigarettes or analogous rod-shaped smokers' products wherein the envelope constitutes one component of the product and surrounds at least one rod-like body which constitutes another component of the product, comprising adjustable perforating means including means for making holes in at least one selected portion of the envelope of each of a series of rod-shaped products; means for moving said series of products past said perforating means; means for monitoring at least one variable characteristic of at least one component of each product of said series, including means for generating first signals denoting the monitored characteristics of successive monitored components; means for comparing said first signals with a reference signal denoting the desired characteristic of each monitored component; and means for adjusting said perforating means to change the combined cross-sectional area of holes in the envelopes of products embodying those components whose monitoring resulted in the generation of first signals deviating from said reference signal.

27. Apparatus as defined in claim 26, wherein each component of said series of products consists of at least one starting material and said monitoring means includes means for monitoring a variable characteristic of the starting material of at least one component of each rod-shaped product.

28. Apparatus as defined in claim 27, wherein said one starting material is a continuous web of porous wrapping material which is converted into the envelopes of said series of products and said variable characteristic is the porosity of said web.

29. Apparatus as defined in claim 28, wherein said web is transported lengthwise along a predetermined path and said monitoring means comprises means for establishing a pressure differential at the opposite sides of the moving web in a predetermined portion of said path, said signal generating means including means for generating first signals which vary as a function of variations of said pressure differential.

30. Apparatus as defined in claim 29, wherein said signal generating means comprises transducer means arranged to convert pneumatic signals denoting said pressure differential into electrical signals.

31. Apparatus as defined in claim 28, wherein said web is transported lengthwise along a predetermined path and said monitoring means comprises a radiation source adjacent to one side of said path and arranged to direct a beam of radiation against successive increments of the moving web in said path and a radiation detector disposed at the other side of said path and exposed to radiation which penetrates through the pores of the moving web.

32. Apparatus as defined in claim 27, wherein said one starting material is a moving tobacco filler which is converted into the rod-like bodies of said series of products, said monitoring means including means for monitoring the quantity of tobacco in successive predetermined lengths of the moving filler.

33. Apparatus as defined in claim 32, wherein said monitoring means comprises means for conveying a stream of a gaseous testing fluid transversely across successive increments of the moving filler whereby the resistance which successive increments of the filler offer to the flow of said fluid varies with changes of the quantity of tobacco in such increments, said signal generating means including means for generating said first signals as a function of the rate of flow of fluid across successive increments of said filler.

34. Apparatus as defined in claim 32, wherein said monitoring means comprises means for directing a beam of corpuscular radiation across successive increments of the moving filler whereby the filler absorbs radiation to an extent which is a function of the quantity of tobacco in the respective increments, and a radiation detector at the other side of said path opposite said beam directing means.

35. Apparatus as defined in claim 32, wherein the starting material for said one component includes a web of porous wrapping material and said monitoring means further comprises means for moving said web lengthwise along a predetermined path and means for monitoring the porosity of successive increments of the moving web in a predetermined portion of said path, said signal generating means including means for generating said first signals as a function of the quantity of tobacco and the porosity of web portions forming part of said series of products.

36. Apparatus as defined in claim 27, wherein said one starting material includes tobacco fillers which form part of the bodies of said products and said monitoring means includes means for ascertaining the resistance which said fillers offer to axial flow of a gaseous fluid therethrough.

37. Apparatus as defined in claim 26, wherein said variable characteristic is a characteristic of the envelopes of said products, said monitoring means including means for monitoring said variable characteristic of the envelopes of said series of products.

38. Apparatus as defined in claim 26, wherein said variable characteristic is a characteristic of the bodies of said products and said monitoring means comprises means for monitoring said variable characteristic of the bodies of said series of products.

39. Apparatus as defined in claim 26, wherein said variable characteristic is the permeability of the envelopes of said products and said monitoring means comprises means for monitoring the permeability of the envelopes of said series of products.

40. Apparatus as defined in claim 26, wherein said variable characteristic is the resistance which the bodies of said products offer to axial flow of a gas therethrough and said monitoring means comprises means for monitoring said resistance of the bodies of said series of products.

41. Apparatus as defined in claim 26, wherein said monitoring means includes a first testing device including means for monitoring the permeability of the envelopes of said series of products and a second testing device including means for monitoring the resistance which the bodies of said series of products offer to axial flow of a gas therethrough.

42. Apparatus as defined in claim 41, wherein said signal generating means comprises a first signal generator arranged to transmit to said adjusting means signals denoting the permeability of the envelopes of said series of products and a second signal generator arranged to transmit to said adjusting means signals denoting the resistance of the bodies of said series of products.

43. Apparatus as defined in claim 42, wherein each of said bodies includes a rod-like tobacco filler and said monitoring means further comprises means for monitoring the quantity of tobacco in said fillers and said signal generating means comprises a third signal generator arranged to transmit to said adjusting means signals denoting the quantity of tobacco in the fillers forming part of the bodies of said series of products.

44. Apparatus as defined in claim 26, wherein said means for making holes comprises at least one laser.

45. Apparatus as defined in claim 44, wherein said moving means comprises means for temporarily arresting the products of said series while said hole making means makes holes in the products.

46. Apparatus as defined in claim 45, wherein said means for temporarily arresting includes means for rotating the products of said series about their respective axes.

47. Apparatus as defined in claim 44, wherein said laser includes means for focusing at least one laser beam upon the envelopes of said series of products and said adjusting means includes means for varying the intensity of said beam.

48. Apparatus as defined in claim 44, wherein said laser includes means for focusing at least one laser beam upon the envelopes of said series of products and said adjusting means includes means for varying the intervals of impingement of said beam upon the envelopes of said series of products.

49. Apparatus as defined in claim 26, further comprising means for ascertaining the combined cross-sectional area of holes in the envelopes of said series of products.

50. Apparatus as defined in claim 49, further comprising means for generating second signals denoting the combined cross-sectional area of holes in said envelopes, means for comparing said second signals with a reference signal denoting the desired range of cross-sectional areas, and means for segregating from the products of said series of each product wherein the combined cross-sectional area of holes in its envelope deviates from said range.

51. Apparatus as defined in claim 49, further comprising means for generating second signals denoting the combined cross-sectional area of holes in each of said envelopes, means for comparing said second signals with a reference signal denoting the desired range of combined cross-sectional areas, and means for transmitting to said adjusting means signals for adjustment of said perforating means when at least one second signal deviates from said last mentioned reference signal.

52. Apparatus as defined in claim 26, wherein said perforating means forms part of a machine for the production of plain cigarettes.

53. Apparatus as defined in claim 52, wherein said machine includes means for converting a rod-like tobacco filler into the bodies of said products and said perforating means is adjacent to said filler.

54. Apparatus as defined in claim 26, wherein each of said envelopes has a longitudinally extending seam and said means for making holes is arranged to make holes in the seams of the envelopes of said series of products.

* * * * *